United States Patent [19]
Finger

[11] 3,778,702
[45] Dec. 11, 1973

[54] OPERATING TIME REMAINING COMPUTER

[75] Inventor: Eugene P. Finger, Brewster, N.Y.

[73] Assignee: Curtis Instruments, Inc., Mount Kisco, N.Y.

[22] Filed: July 13, 1971

[21] Appl. No.: 162,148

[52] U.S. Cl.................... 324/29.5, 320/48, 324/94
[51] Int. Cl. ........................................... G01n 27/42
[58] Field of Search........................... 324/29.5, 94; 320/48

[56] References Cited
UNITED STATES PATENTS

| | | | |
|---|---|---|---|
| 3,422,337 | 1/1969 | Carson................................ | 324/94 |
| 3,421,067 | 1/1969 | Wilson................................ | 324/94 |
| 3,593,099 | 7/1971 | Scholl................................ | 324/29.5 |
| 3,546,576 | 12/1970 | Frezzolini........................... | 324/29.5 |
| 3,500,167 | 3/1970 | Applegate........................... | 320/48 |
| 3,617,850 | 11/1971 | Domshy............................... | 320/48 |

Primary Examiner—Stanley T. Krawczewicz
Attorney—Dean S. Edmonds et al.

[57] ABSTRACT

A computer for determining the time remaining at the present rate of energy dissipation before a finite energy source is completely drained of energy. The rate of energy consumption is sensed and then modified by a function generator in accordance with the effect that the rate of energy consumption has on the quantity of energy available from the source. The modified rate of dissipation, i.e., effective rate of energy dissipation, is fed to a coulometer having an output capacitance which is varied in accordance with the integral of the modified signal. The change in the output capacitance is measured by feeding a high frequency interrogation signal to the coulometer. This signal is developed across the output capacitance thereof and accordingly has an envelope which is proportional to the integral of the modified rate of energy dissipation. The developed signal is amplified by an AC amplifier and demodulated by an envelope detector. The demodulated signal is then subtracted from a predetermined value representative of the total rated energy in the system. This resulting value represents the energy remaining in the system. This energy remaining value is then divided by the modified rate of energy dissipation to provide the time remaining at the present rate of energy dissipation.

12 Claims, 4 Drawing Figures

INVENTOR
EUGENE P. FINGER

INVENTOR
EUGENE P. FINGER

BY
Pennie, Edmonds, Morton, Taylor & Adams
ATTORNEYS

OPERATING TIME REMAINING COMPUTER

BACKGROUND OF THE INVENTION

This invention relates to a method and apparatus for computing the time remaining at the present rate of energy dissipation before a finite source of energy is completely drained of energy. More specifically, this invention relates to a time remaining computer for a finite energy system utilizing a means such as a coulometer for integrating the effective rate of energy dissipation to derive effective energy dissipated in the system.

Many sources of electrical energy utilized today, such as, for example, cells or batteries, can be considered as finite sources of energy. These units of electrical energy are characterized as initially having a rated amount of energy which may be dissipated and which are not rechargeable during the dissipation process. Such sources of power are employed in many areas of technology where the utilization of electrical energy and conservation thereof is often critical to the successful operation of the system they power. Thus, for example, in space technology it is sometimes necessary to know the energy remaining in a source of power so that the operator of the system, be it a computer or a human being, can tailor the use of the remaining energy for the most efficient and optimum utilization thereof. Further, it is often necessary to accurately know the time remaining in a finite energy system before the source of energy is completely dissipated in order, for example, that some loads less critical than others may be disconnected when the time remaining is short.

In the past, there have been many systems developed for determining the charge or energy remaining in finite energy sources. Thus, for example, some such previously proposed systems have relied upon the value of a battery's voltage to indicate the state of battery charge. However, it has been found that battery voltage is not a particularly good charge indicator for many types of cells and batteries. For example, the charging or discharging of a commonly used nickel-cadmium battery to about 95 percent of its capacity produces voltage variations which are dependent on many factors such as temperature, pressure, battery history, and the state of charge of the battery. Hence, it follows that voltage sensing to determine the state of battery charge is quite inefficient and often erroneous. Other systems have been developed which monitor the discharge from the energy source and which integrate the rate of discharge to give an indication of the total charge dissipated. Then by knowing the total charge in the energy source, a comparison can be made to determine how much charge is remaining. These charge remaining calculating systems have often utilized mechanical comparing and display means and, accordingly, have been bulky and at the same time required relatively large quantities of valuable energy for operating. These prior art systems have often produced erroneous results because the modulating affect that the level of the rate of energy dissipation, i.e., the level of power consumption, has on the total capacity of the energy source was not taken into account. It is well-known, for example, that when the rate of dissipation of energy from a battery is high, the actual capacity of the battery is often reduced substantially below the rated capacity. Previously proposed charge remaining calculators have failed to compensate for such non-linear effects and, accordingly, have often produced significant errors in indicating that charge remained in the battery when, in fact, the battery was completely drained of charge.

It, therefore, is an object of this invention to provide an accurate and efficient time remaining computer for a finite energy source.

It is another object of this invention to provide an operating time remaining computer for a finite energy system having a means for accounting for non-linear effects on the capacity of the energy source due to the rate of energy dissipation.

SHORT STATEMENT OF THE INVENTION

Accordingly, this invention relates to a method and apparatus for computing the energy and the time remaining at the present rate of energy dissipation before the energy in a finite energy source is consumed. The rate of energy dissipation is sensed and modified to account for the effect that the rate of energy consumption has on the total energy available from the source. The modified signal is integrated by a means such as a coulometer integrator to give the effective energy dissipated from the source of energy. This signal is then detected and subtracted from the total rated energy available in the energy source thereby giving the energy remaining in the system. The resulting energy remaining signal is divided by the modified rate of energy dissipation, i.e., the effective rate of energy dissipation, to give the time remaining before the source of energy is completely dissipated.

BRIEF DESCRIPTION OF THE DRAWINGS

Other objects, features, and advantages of this invention will become more fully apparent from the following detailed description, appended claims, and the accompanying drawings in which:

DETAILED DESCRIPTION

Figure 1:
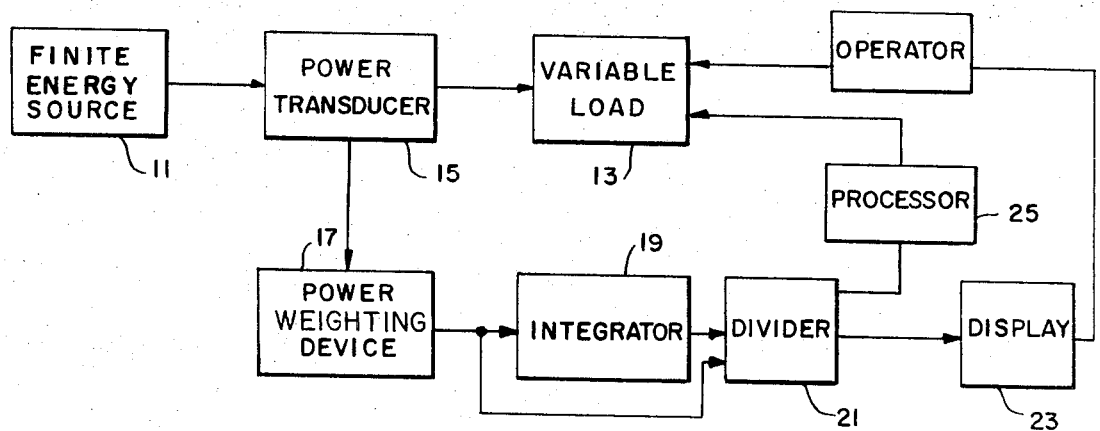
FIG. 1 shows a block diagram of the operating time remaining computer of this invention.

FIG. 1 shows a block diagram of the operating time remaining computer of this invention. A finite energy source 11 such as a cell or a battery supplies power to a variable load 13 through a power transducer 15. Variable load 13 may consist of a plurality of individual loads some of which may be variable with respect to time and some of which may be selectively connected or disconnected from the source of power 11. Power transducer 15 is an essentially lossless sensing device which provides information as to the rate of energy being dissipated from energy source 11. If the finite energy source 11 provides a constant voltage, power transducer 15 may be a resistor having a very small value relative to the load resistance and is connected in series between the source of energy and the system load 13. The sensed power flow or rate of energy dissipation from source 11 is fed to a power weighting device 17 which in the preferred embodiment is a function generator utilizing an operational amplifier having a variable gain that is dependent upon its input.

Figure 3:
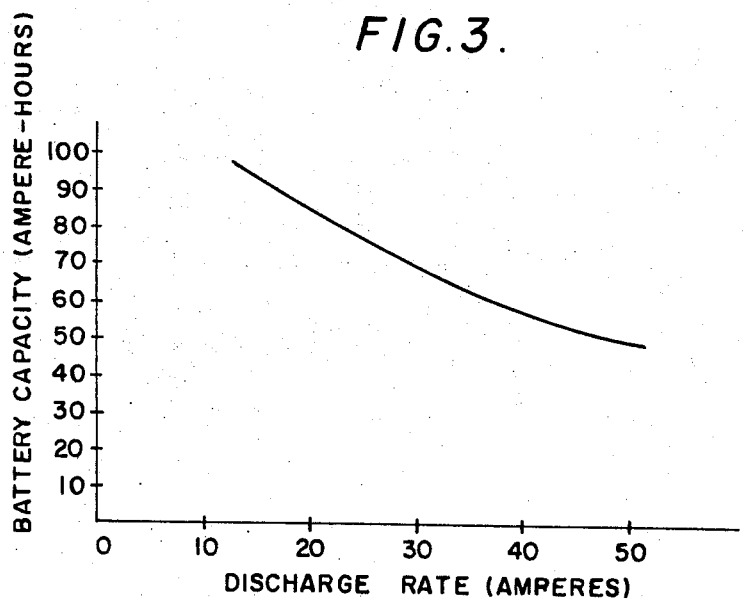
FIG. 3 shows a typical curve illustrating the non-linear effect of the discharge rate on battery capacity.

By reference to FIG. 3 it will become apparent why such a weighting device is necessary for accurate computation of energy and time remaining in a source of electrical energy. Briefly, FIG. 3 shows a graphical display of the typical effect of a range of discharge rates on the capacity of a battery or cell. The abscissa represents the discharge rate in amperes assuming a constant voltage source. The ordinate represents the battery capacity in ampere-hours. Inspecting the graph, the curve illustrated is for a battery having a rated capacity of 100 ampere-hours at 12.5 amperes. If 50 amperes is being fed from the battery to a load, the battery capacity will be 50 ampere-hours and, accordingly, the life of the battery will be 1 hour. If the discharge rate is 12.5 amperes, the capacity of the battery will be 100 ampere-hours; and, accordingly, the battery can be expected to last 8 hours before its charge will be completely dissipated. It can be seen that the higher the rate of energy dissipation from the battery the lower will be the capacity of the battery. Thus, the modulating affect on battery capacity of the rate of energy dissipation must be taken into account in order to provide an accurate indication of the energy or time remaining in the battery. Accordingly, the power weighting device 17 is necessary to provide a variable correction factor based on the rate at which power is being dissipated from energy source 11.

The output from the power weighting device 17, i.e., the effective rate of energy dissipation, is fed to an integrator 19 for integration with respect to time. Integrator 19 may be any suitable integration device, such as, for example, an operational amplifier having a capacitor in the feedback circuit. However, in the preferred embodiment the integrator 19 is a coulometer, a well-known electrochemical device which will be discussed more fully hereinafter. The output of the integrator 19 is amplified and subtracted from the total rated energy in the energy source 11. The resulting signal is an indication of the energy remaining in source 11. This signal is divided in divider circuit 21 by the output signal from the power weighting device 17 to provide the time remaining at the measured rate of energy dissipation before the energy source is completely dissipated. The time remaining signal is then fed to an output display unit 23 which may be any suitable device such as a voltmeter. The output from the divider may also be fed to a processor 25 which in response to the divider signal adjusts the variable load 13 for the most efficient and optimum use of the energy from source 11. Processor 25 may be, for example, a special purpose computer pre-programmed to operate in a given manner depending on the output time remaining voltage from the divider 21.

Figure 2:
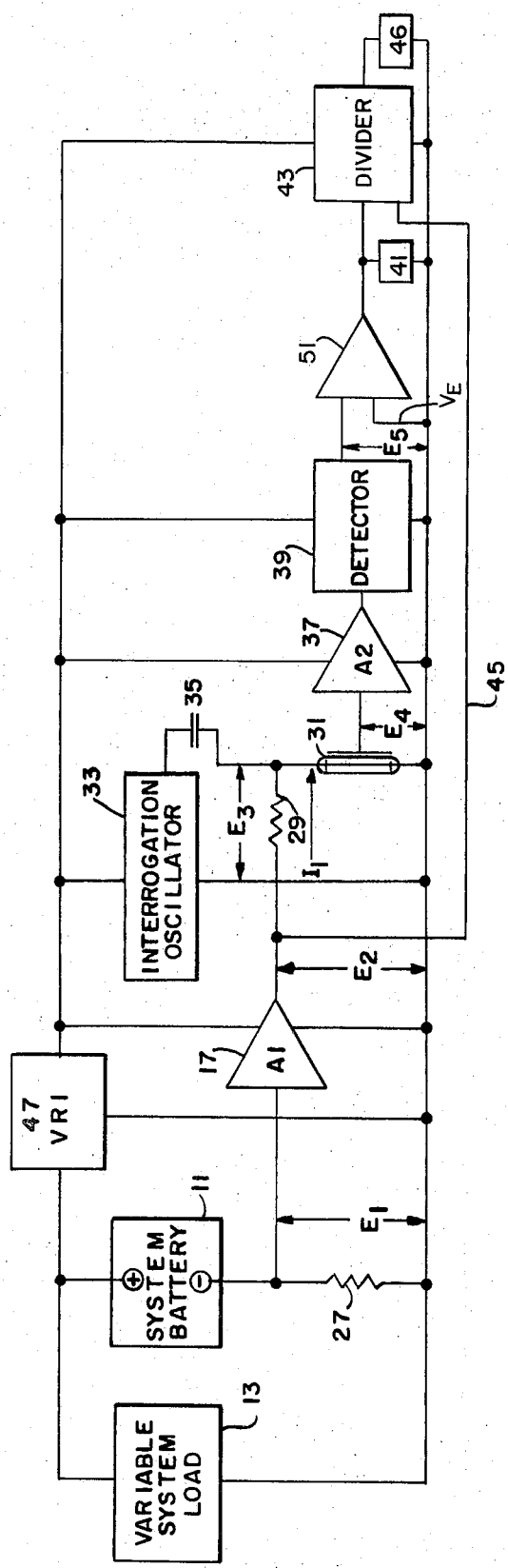
FIG. 2 shows a specific embodiment of the operating time remaining computer shown in FIG. 1.

Refer now to FIG. 2 which shows the preferred embodiment of the time remaining computer discussed in conjunction with FIG. 1. A finite source of energy 11, such as a battery, is connected through a power sensing resistor 27 to a variable system load 13. The variable load 13 may be a single variable resistor or may be a combination of individual loads some of which are variable with respect to time and some of which may be selectively connected to or disconnected from the battery 11. Resistor 27 should be very small relative to the resistance of the load 13 so that it becomes a substantially lossless power transducer. Thus, in the preferred embodiment, the value of resistor 27 is only 0.002 ohms. Accordingly, the voltage ($E_1$) developed across resistor 15 is very small and must be amplified.

Figure 4:
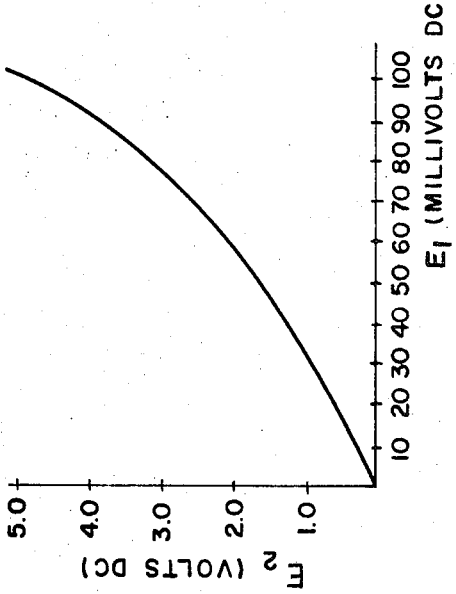
FIG. 4 is a graphical display of the gain curve of the function generator of FIG. 2.

A function generator 17 is shown which amplifies and modifies the input signal $E_1$ from transducer 15 to account for the effect that the rate of discharge has on the total capacity of the battery. Refer now to FIG. 4 for a brief discussion of the transfer characteristics of the function generator 17. Shown in the figure is a graphical display of the input of the function generator 17 with respect to the output thereof. The abscissa represents the generator input voltage $E_1$ in millivolts, and the ordinate represents the output $E_2$ of the generator in voltgs. The steady state gain of the generator is 25 in the preferred embodiment but it should be understood that any suitable value may be used. As aforementioned, the function generator must transform the input voltage $E_1$ to account for the changed capacity of the battery when differing rates of energy are dissipated therefrom. Therefore, as the generator input voltage increases, the output voltage must increase at an even higher rate. The specific transfer curve is the product of a steady state amplification factor, i.e., 25 and a differing rate factor at each input value which may be derived by taking the ratio of the battery capacity under rated conditions and dividing by the battery capacity under a number of differnent discharge rates. Thus, referring to FIG. 3, when 12.5 amperes are being discharged from battery 11, the capacity of the battery is 100 ampere-hours. This value divided into the rated capacity which is also 100 ampere-hours generates a rate factor of unity. Accordingly, at a discharge rate of 12.5 amperes, the gain of function generator 17 is 25. If, for example, 18 amperes is being fed to the load 13 rather than the 12.5 amperes at which the battery was rated, the battery capacity is now only 90 ampere-hours rather than 100 ampere-hours. This new capacity value is divided into rated capacity, i.e., 100 ampere-hours, to give a rate factor of 1.11. Accordingly, the gain of the function generator 17 at this dissipation level is 27.75. If 50 amperes are being fed to the load system 13, the capacity of the battery, by inspection of the graph, will be found to be 50 ampere-hours rather than 100 ampere-hours as rated. Accordingly, the rate factor will be 2, that is, at this rate of energy dissipation, the function generator 17 must amplify the input $E_1$ at twice the gain factor that the input is amplified when only 12.5 amperes are being fed to the load 13 because the capacity of the battery when 50 amperes is being dissipated is reduced by one-half. Thus, function generator 17 provides a gain that is dependent upon the input thereto. Such generators are well-known in the art and, accordingly, will not be described in detail in order to more clearly and concisely describe the invention.

The modified output of generator 17 gives an indication of the effective rate of power dissipation from battery 11. This signal is fed through a current limiting resistor 29 to a coulometer 31. Coulometers, such as 31, are discussed in detail in U.S. Pat. No. 3,255,413, filed May 24, 1962, by Edward Marwell et al., entitled Electro-Chemical Coulometer Including Differential Capacitor Measuring Elements. Briefly, coulometer 31 has two columns of a liquid metal, such as mercury, separated by an electrolyte, such as a water solution of potassium iodide and mercuric iodide, each of which are situated in a tube with the mercury being separated by the electrolyte. A conductive sheath is formed around the external periphery of the tube with the two columns of mercury and the sheath forming a pair of ganged differential capacitors. Current being fed to the coulometer from the function generator 17 through resistor 29 causes the mercury from the first column to be electrically deposited through the electrolyte onto the second column. Thus, the position of the electrolyte and the length of the respective columns of mercury are varied in accordance with the charge being fed thereto, and this in turn varies the capacitance between each mercury column and the conductive sheath; the changed capacitance varying as the integral of the current input to the coulometer.

The output of the coulometer is determined by sensing the effect that the changing output capacitance has on a high frequency AC signal. Thus, in order to detect the output capacitance, an interrogation oscillator 33 is provided. Oscillator 33 is a source of high frequency signals (e.g. 80KHz) and has a substantially zero source impedance thereby making the oscillator appear to be a constant voltage source. The signals from the interrogation oscillator are fed through a blocking capacitor 35 to the coulometer with the blocking capacitor preventing current from generator 17 from feeding into the oscillator output terminal. The value of the capacitor should be high so that the impedance it presents to the oscillator output signal is small. The effective electrolytic resistance of the coulometer 31 is very low but is variable with respect to different coulometers. Accordingly, resistance 29 should be much larger than the effective resistance of the coulometer so that the function generator 17 appears as a constant current generator. It can be seen that the output of the coulometer 31 is a high frequency, amplitude modulated, signal having an envelope that corresponds to the integrated effective rate of energy dissipation from the battery 11.

This integrated signal is fed to an AC amplifier 37 the output of which is then fed to a detector 39 which demodulates the signal by techniques well-known to those skilled in the amplitude demodulation technology. Detector 39 produces a signal corresponding to the envelope of the output of the coulometer 31 as amplified by amplifier 37. This signal which represents the effective energy dissipated from the battery is subtracted from the total rated energy of the battery which may be represented by a voltage $V_E$ to give the energy remaining in the battery system 11. This may be accomplished by a differential amplifier 51 or any other suitable means known in the art. This subtracted signal is fed to a display device 41 which may be a typical voltmeter or any other suitable electrical display meter.

The energy remaining signal from detector 39 is also fed to a divider 43 where the signal is divided by the effective rate of energy dissipation derived at the output of function generator 17 which signal is fed to the divider 43 along line 45. Means for dividing electronic signals are well-known in the art and accordingly will not be discussed in detail herein in order that the invention may be more concisely described. The output of the divider 43 represents the time remaining in the battery system at the sensed rate of discharge. This signal is fed to display unit 46 which, as aforementioned, may be a voltmeter or other suitable means for displaying the time remaining in the battery. The output from divider 43 may also be fed to a processor, as discussed with respect to FIG. 1, to adjust the variable load system 13 for more efficient and/or optimum utilization of the energy remaining in battery 11.

The power for driving the function generator 17, interrogation oscillator 33, amplifier 37, detector 39, and divider 43 is derived from a voltage regulator 47 which regulates power supplied thereto by system battery 11.

It should be understood that the circuitry described and illustrated in the preferred embodiment may be altered to include other embodiments within the spirit and scope of the invention as defined by the appended claims, Thus, for example, the effect of the discharge rate on battery capacity may be sustantially different from that shown in FIG. 3 and accordingly the gain curve is illustrated in FIG. 4 may be changed.

I claim:

1. A circuit for computing the energy remaining in a finite source of energy comprising:
    a means for sensing the rate of energy dissipation from said source,
    means for modifying said sensed rate of energy dissipation to give the effective rate of energy dissipation, said effective rate accounting for the effect said rate of energy dissipation has on the energy available from said source,
    means for integrating said effective rate of energy dissipation, and
    means for comparing said integrated effective rate of energy dissipation with a value representing the initial energy capacity of said source to indicate the energy remaining in said source.

2. The circuit of claim 1 wherein said means for comparing includes means for subtracting said integrated effective rate of energy dissipation from a value representing the initial energy capacity of said source to give the value of energy remaining in said source.

3. The circuit of claim 2 wherein said means for integrating said modified rate of energy dissipation includes a coulometer integrator.

4. The circuit of claim 3 wherein said means for modifying said sensed rate of energy dissipation to give the effective rate of energy dissipation includes an amplifier having a gain dependent upon said sensed rate of energy dissipation, said gain being directly proportional to the rated capacity of said source divided by the capacity of said source at said sensed rate of energy dissipation.

5. The circuit of claim 4 wherein said coulometer integrator comprises an output capacitance, means for varying said output capacitance in accordance with the integral of the effective rate of energy dissipation, means for generating a high frequency signal, means for supplying said signal to said coulometer integrator, and means for detecting the output of said output capacitance.

6. The circuit of claim 2 further comprising means for dividing said value of energy remaining in said source by said effective rate of energy dissipation, the quotient being the time remaining, at said effective rate of energy dissipation, before said energy in said source is dissipated.

7. The circuit of claim 6 wherein said means for integrating said transformed rate of energy dissipation includes a coulometer integrator.

8. The circuit of claim 7 wherein said means for transforming said sensed rate of energy dissipation to give the effective rate of energy dissipation includes and amplifier having a gain dependent upon said sensed rate of energy dissipation, said gain being directly proportional to the rated capacity of said source divided by the capacity of said source at said sensed rate of dissipation.

9. The circuit of claim 8 wherein said coulometer integrator comprises an output capacitance, means for varying said output capacitance in accordance with the integral of the effective rate of energy dissipation, means for generating a high frequency signal, means for supplying said signal to said coulometer integrator, and means for detecting the output of said coulometer.

10. A method of computing the energy remaining in a finite source of energy comprising:
sensing the rate of energy dissipated from said source,
modifying said sensed rate of energy dissipation to give the effective rate of energy dissipation,
integrating said effective rate of energy dissipated, and
comparing said integrated effective rate of energy dissipation with a signal representing the initial energy capacity of said source to indicate the energy remaining in said source.

11. The method of claim 10 wherein said comparing step comprises the step of subtracting said integrated effective rate of energy dissipation from a value representing the initial capacity of said source.

12. The method of claim 11 further comprising the step of dividing said energy remaining signal by said effective rate of energy dissipation, the quotient being the time remaining before said energy in said source is dissipated.

* * * * *

UNITED STATES PATENT OFFICE
CERTIFICATE OF CORRECTION

Patent No. 3,778,702      Dated December 11, 1973

Inventor(s) Eugene P. Finger

It is certified that error appears in the above-identified patent and that said Letters Patent are hereby corrected as shown below:

Column 4, line 24, "differnent" should read -- different --.

Claim 11, line 4, after "source" and before the period there should be inserted -- to give the energy remaining in said source --.

Signed and sealed this 29th day of October 1974.

(SEAL)
Attest:

McCOY M. GIBSON JR.
Attesting Officer

C. MARSHALL DANN
Commissioner of Patents